United States Patent

Sommer

[15] 3,680,666

[45] Aug. 1, 1972

[54] MOTOR BRAKE UNIT

[72] Inventor: Gordon M. Sommer, Grosse Pointe Woods, Mich.

[73] Assignee: G. M. Sommer Co., Inc., Detroit, Mich.

[22] Filed: Jan. 8, 1970

[21] Appl. No.: 1,358

[52] U.S. Cl. ............... 188/170, 188/71.5, 188/71.6, 188/72.3, 188/264 E, 192/70.2
[51] Int. Cl. .............................................. F16d 65/24
[58] Field of Search ....... 188/71.5, 71.6, 72.4, 264 E, 188/72.1, 72.3, 170; 192/70.2

[56] References Cited

UNITED STATES PATENTS

| 3,536,230 | 10/1970 | Williams | 188/170 X |
| 2,953,040 | 9/1960 | Christenson et al. | 188/71.5 X |
| 3,500,970 | 3/1970 | Schilling | 188/72.3 X |
| 854,720 | 5/1907 | Dawson | 188/264 E |
| 2,025,098 | 12/1934 | Dudick | 188/71.5 X |
| 2,823,770 | 2/1958 | Helvern | 188/71.5 |
| 2,964,137 | 12/1960 | Luedtke et al. | 188/71.5 |

Primary Examiner—George E. A. Halvosa
Attorney—Harness, Dickey & Pierce

[57] ABSTRACT

A motor brake unit comprising a relatively non-rotatable housing, a collar member adapted to rotate with the motor drive shaft, a plurality of rotatable discs connected to the collar member, a plurality of non-rotatable discs disposed adjacent the rotatable discs, and mounted on the housing, means for supporting at least some of the discs for axial movement toward and away from other of the discs, and actuating means for selectively moving said movable discs into frictional engagement with the non-rotatable discs, during a braking operation.

8 Claims, 3 Drawing Figures

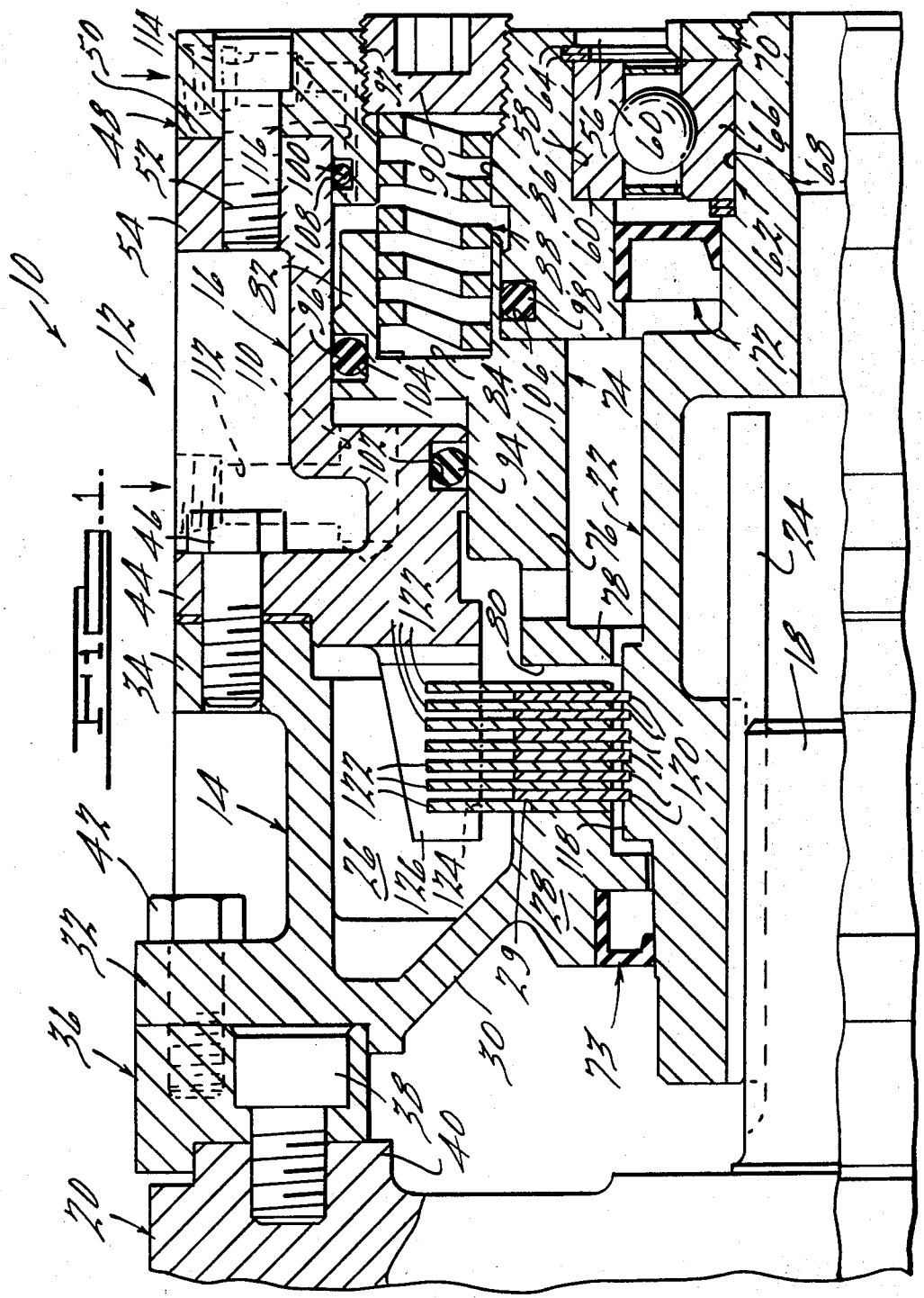

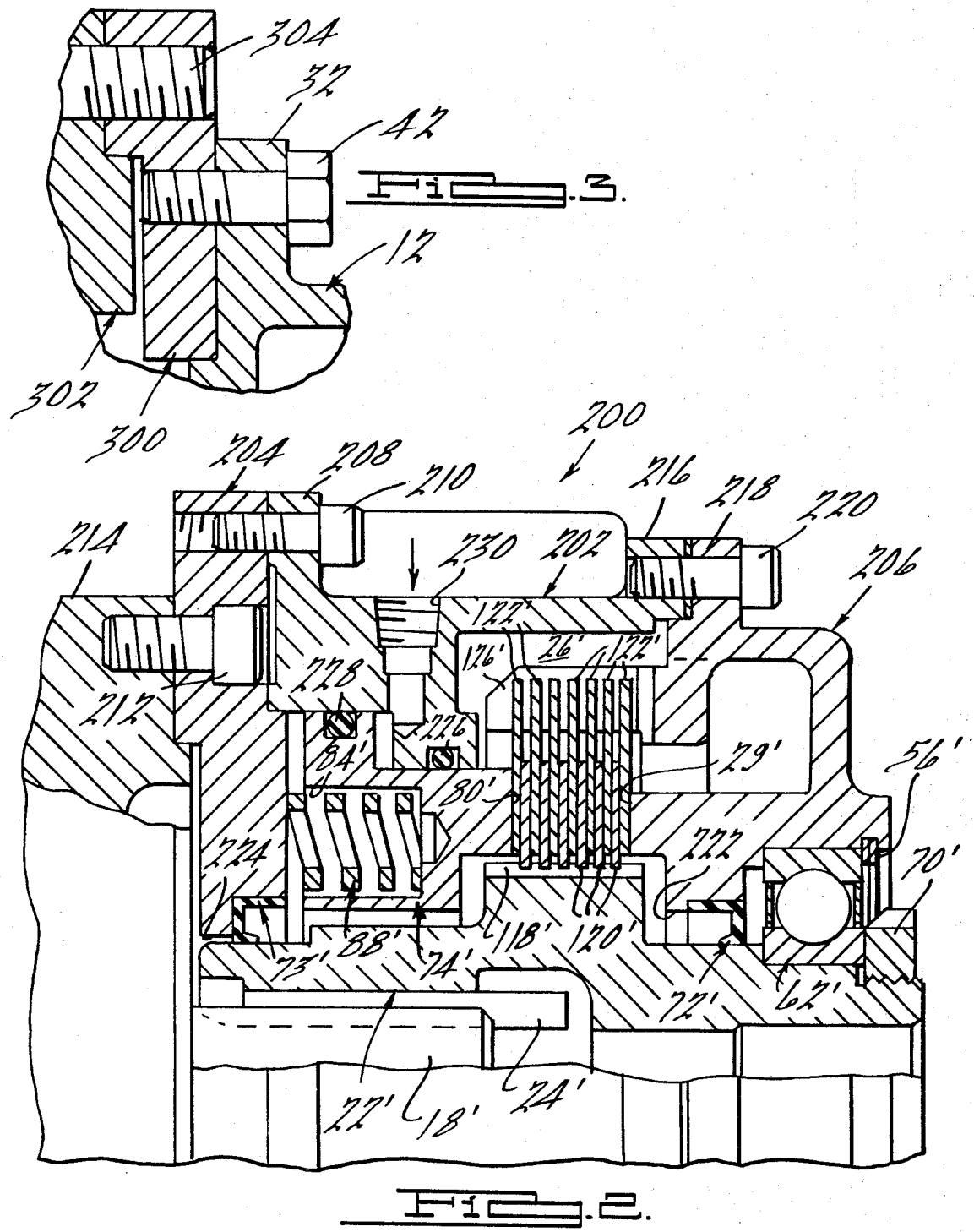

MOTOR BRAKE UNIT

SUMMARY OF THE INVENTION

The present invention relates, generally, to a motor brake unit and, more particularly, to a new and improved motor brake unit wherein the braking elements thereof are submerged in a cooling fluid medium which provides for maximum cooling and minimum wear.

It is accordingly an important object of the present invention to provide a new and improved motor brake unit that utilizes a plurality of friction discs which are submerged in an oil bath that functions to effectively transfer the heat created during a braking operation away from the discs.

It is another object of the present invention to provide a new and improved motor brake unit that will find a universality of application with different types and sizes of motors.

It is yet another object of the present invention to provide a motor brake unit that will find particular application in any environment in which electric brakes could be used.

It is still another object of the present invention to provide a new and improved motor brake unit of the above described character that can be operated at high speeds and at high cyclic rates.

It is yet another object of the present invention to provide a new and improved motor brake unit that is extremely small and compact in size.

It is yet another object of the present invention to provide a new and improved motor brake unit that may be completely preassembled and which is entirely sealed to the atmosphere so as to prevent the ingress of any dirt, dust or other foreign material therein.

Other objects and advantages of the present invention will become apparent from the following detailed description taken in conjunction with the accompanying drawings.

BRIEF DESCRIPTION OF THE DRAWINGS

FIG. 1 is a longitudinal side elevational view, partly broken away, of a motor brake unit embodying the principles of the present invention;

FIG. 2 is a longitudinal side elevational view, partly broken away, of another embodiment of the present invention, and FIG. 3 is a side elevational view of an additional embodiment of the mounting assembly adapted to be used with the motor brake unit illustrated in FIG. 1.

DETAILED DESCRIPTION OF THE PREFERRED EMBODIMENT

Referring now in detail to the drawings, and in particular to FIG. 1, a motor brake unit 10, in accordance with one embodiment of the present invention, is shown as generally comprising a pair of annular enclosure members 14 and 16 which are arranged axially or longitudinally of a rotatable drive shaft 18 of a conventional motor 20 with which the unit 10 is operatively associated. The drive shaft 18 is surrounded by a concentrically oriented, longitudinally extending sleeve or collar 22 which is secured against rotation relative to the shaft 18 by means of a suitable longitudinally extending keyway 24. The sleeve 22 together with the enclosure members 14, 16 define an annular chamber or cavity 26 within which the brake elements of the present invention are operatively disposed, as will hereinafter be described in detail.

The enclosure member 14 comprises an abuttment section 28 which defines a radially extending face 29 and is arranged radially outwardly from the collar 22 and secured to the member 14 by an integral, longitudinally and radially outwardly extending end wall 30. The member 14 also comprises a pair of radially outwardly extending, longitudinally spaced shoulders 32 and 34, the former of which serves to operatively secure the enclosure member 14 to an annular or ring-shaped mounting plate or adaptor 36. The adaptor 36 is adapted to be fixedly secured by means of a plurality of circumferentially spaced screws, bolts or the like 38 to an axially or longitudinally outwardly projecting lug section 40 formed in the end of the housing of the motor 20; and the shoulder 32 is adapted to be fixedly secured to the adaptor 36 by means of a plurality of circumferentially spaced, axially extending screws, bolts or the like 42, as illustrated in FIG. 1. The shoulder 34 of the enclosure member 14 is adapted to be fixedly secured to a radially outwardly extending annular flange section 44 formed on one axial end of the enclosure member 16 by means of a plurality of circumferentially spaced, axially extending screws, bolts or the like 46, which results in the enclosure member 16, as well as the member 14, being fixedly secured against relative rotation with respect to the housing of the motor 20.

While one axial end of the chamber or cavity 26 is closed by the end wall section 30 of the enclosure member 14, the opposite end of said cavity 26 is closed by a cooperable end wall member or plate 48 which is formed with an annular, radially outwardly extending mounting section 50 that is adapted to be fixedly secured by means of suitable screws, bolts or the like 52 to a radially outwardly extending annular shoulder section 54 formed on the axially opposite ends of the enclosure member 14 from the shoulder portion 44. The end wall member 48 is formed with a central annular opening 56 through which the axially outer end of the collar 22 extends, the opening 56 defining an annular shoulder 58 within which the outer race 60 of an anti-friction bearing assembly 62 is secured by means of suitable snap or retaining rings 64. The assembly 62 comprises an inner race 66 which is adapted to be carried on a reduced diameter cylindrical surface 68 on the axially outer end of the collar 22 and be positively retained thereon by means of a threadably mounted retaining ring 70. It will thus be seen that the bearing assembly 62 enables the collar 22 to be freely rotatable relative to the housing 12, whereby to permit the unit 10 to be completely preassembled prior to installation thereof on the associated motor. Means in the form of suitable cup-like fluid seals 72 and 73 are preferably provided interjacent the outer periphery of the collar 22 and the inner peripheries of the end wall member 48 and wall member 30, whereby to provide a fluid seal at the axially outer end of the collar 22.

Disposed interiorly of the enclosure member 14 is an annular actuating piston member, generally designated 74, which comprises a generally cylindrically shaped main body portion 76 that is arranged coaxially of and spaced radially outwardly from the collar member 22 and drive shaft 18. The axially inner end of the piston member 74 is provided with an integral radially inwardly extending abutment section 78 that defines a radially extending abutment face 80. The axially opposite (outer) end of the piston member 74 is formed with a radially and axially outwardly extending section 82 which is provided with a plurality of circumferentially spaced, axially extending annular bores or recesses, generally designated 84. The recesses 84 are adapted to be circumferentially and axially aligned with a plurality of cooperable bores 86 that are formed in the end wall member 48 and, together with the recesses 84, are adapted to nestingly receive a plurality of helical coil springs, one of which is shown in FIG. 1 and designated by the numeral 88. The axially outer ends of the bores 86 are provided with suitable closure plugs or caps 90 which are threadably and removably disposed within suitable counterbores 92 to normally retain the coil springs 88 in place, yet provide for removal and replacement thereof, where necessary. It will be seen that the plurality of springs 88 function to resiliently urge or bias the piston member 74 toward the left in FIG. 1, whereby the face 80 of the member 74 will function to effect a braking action on the drive shaft 18, in a manner hereinafter to be described. In order to assure against fluid leakage out of the cavity 26, means in the form of a plurality of O-ring seals or the like 94, 96, 98 and 100 are preferably disposed within suitable recesses 102, 104, 106 and 108 on the members 14, 74 and 48, respectively, whereby to permit longitudinal reciprocal movement of the piston member 74, yet prevent any fluid egress from the cavity 26.

Means for selectively actuating or reciprocating the piston member 74 is provided by a plurality of fluid passageways which are adapted to communicate one or more sources of pressurized actuating fluid (either hydraulic or pneumatic) with the opposite sides of the piston member 74. More particularly, the axially inner side of the piston member 74 is adapted to be communicated via suitable fluid passages 110 and 112 with a source of pressurized actuating fluid, while the opposite side of the piston member 74 is adapted to be communicated with the same or a different source of pressurized actuating fluid through a radially extending passageway 114 which communicates at its inner end with an axially extending passageway 116. Briefly, in operation, the plurality of coil springs 88 are adapted to bias the piston member 74 to a brake actuating position, and at such time as it is desired to release the brake, pressurized fluid is communicated through the passageways 110 and 112 to the axially inner side of the piston member 74, thereby forcing the same axially outwardly to a deactuated position. The passageways 114 and 116 are adapted to function as an auxiliary or "assist" means for the coil springs 88 in maintaining the piston member 74 in an actuated condition, with such auxiliary pressurized fluid being needed only where the force of the coil springs 88 is insufficient to maintain the desired braking.

The collar 22 is formed with an enlarged diameter, radially outwardly extending section 117 which defines an external spline formation 118 adapted to operatively support a plurality of axially spaced, radially outwardly extending friction elements or discs, generally designated by the number 120, in a manner such that the discs 120 are free to move axially along the collar 22, yet are prevented from rotating relative thereto. Disposed interjacent or interleaved between the plurality of friction discs 120 is a second plurality of friction elements or discs 122 which are each formed with one or more radially inwardly extending recesses 124 adapted to nestingly receive one or more axially inwardly extending retaining lugs 126 that are integrally formed on the axially inner end of the enclosure member 14 and project axially toward the adjacent end of the motor 20. The lugs 126 are adapted to support the plurality of friction discs 122 for longitudinal sliding movement, yet prevent any relative rotation of said discs 122 with respect to the enclosure members 14 and 16. The discs 120, 122 are preferably fabricated of a sintered, heat and wear resistant metallic material and are adapted to function in a manner hereinafter to be described to effect a braking action on the drive shaft 18 and hence upon the associated motor 20 upon preselected actuation of the piston member 74.

The interior of the cavity 26 is adapted to be filled with a fluid cooling medium, such as oil, which functions in a manner such that a substantially high percent of the heat produced due to interaction between the friction discs 120 and 122 during a braking operation is transmitted or conducted directly to the enclosure members 14 and 16, whereby to effectively transmit such heat away from the interior of the motor brake unit 10. The particular configuration of the members 14, 16 will be found to effect sufficient agitation or circulation of the cooling fluid (oil) so that sufficient heat transfer will be achieved without requiring any ancillary means, for circulating said fluid, such as a fluid pump or the like.

Referring now to the overall operation of the motor brake unit 10, assuming the initial conditions that the interior of the cavity 26 is properly filled with a cooling fluid, and that the passages 110 and 112 are communicable with a suitable source of pressurized fluid, the plurality of coil springs 88 will normally function to bias the piston member 74 toward the left in FIG. 1, whereby the face 80 will exert a leftwardly directed force against the plurality of friction discs 120, 122, with the result that said discs, 120, 122 will be compressed between the faces 80 and 29 so that an effective braking action is exerted against the drive shaft 18. At such time as it is desired to relieve the braked condition, the source of pressurized fluid is communicated through the passages 110 and 112, thereby forcing the piston member 74 longitudinally toward the right in FIG. 1 against the resistance of the plurality of springs 88. Such longitudinal movement of the piston member 74 will effect rightward movement of the face 80, resulting in disengagement of the same from the axially outermost of the friction discs 122, thereby releasing the shaft 18 to permit operation of the motor 20. When it is again desired to effect braking of the motor 20, the fluid pressure communicated via the passages 110 and 112 is relieved, with the result that the plurality of springs 88 will bias the piston member 74 toward the left in FIG. 1, resulting in the face 80 thereof moving into engagement with the friction discs 122 and causing all of the friction discs 120, 122 to be compressed between the faces 80 and 29. In the event that additional force is required to effect the desired braking, the action of the springs 88 may be supplemented through the provision of pressurized fluid communicated through the passageways 114 and 116 to the right end of the piston member 74. Additionally, the effective braking force may be controlled by adding or removing one or more springs 88, as will be apparent.

FIG. 2 illustrates an alternate embodiment of the invention comprising a motor brake unit 200, which is intended to be used on somewhat smaller capacity motors than that with which the unit 10 may be operatively associated. The motor unit 200 is similar in construction and operation to the aforedescribed unit 10 and accordingly, in the following detailed description thereof, corresponding component parts will be designated by like numerals provided with a prime (') suffix.

The motor unit 200 comprises an annular or cylindrical enclosure member, generally designated 202 which, together with a pair of longitudinally spaced end wall members 204 and 206, is adapted to define an internal cavity 26'. The enclosure member 202 is formed with a radially outwardly extending flange section 208 at one end thereof which is adapted to be fixedly secured by means of suitable screws, bolts or the like 210 to the outer side of the end wall member 204. The member 204 is in turn adapted to be fixedly secured by means of suitable screws, bolts or the like 212 to one end of the motor housing, herein designated 214, of the motor with which the motor brake unit 200 is operatively associated. The end of the enclosure member 202 opposite the flange section 208 is formed with a second radially outwardly extending flange section 216 which is adapted to abuttingly engage a radially outwardly extending shoulder portion 218 formed around the outer periphery of the end wall member 206, with the section 216 and portion 218 being fixedly secured to one another by means of a plurality of suitable screws, bolts or the like 220.

Disposed interiorly of the cavity 26' is an elongated hollow cylindrical sleeve or collar 22' which is spaced radially outwardly from the periphery of the drive shaft 18' of the associated motor, with the collar 22' extending around the outer end of the shaft 18' and being fixedly secured for rotation therewith by suitable keyway means 24'. The longitudinally outer end of the collar 22' is adapted to be rotatably supported on the end wall member 206 by means of a suitable bearing assembly 62' which is secured to the end wall member 206 by suitable snap ring means 56' and threadably mounted retaining ring 70'. Means in the form of suitable fluid seals 72' and 73' are provided interjacent the outer periphery of the collar 22' and the inner periphery of a pair of central annular openings 222 and 224 provided in the end wall members 206 and 204, respectively.

The outer periphery of the collar member 22' is formed with a spline-formation 118' which is adapted to carry a plurality of friction elements or discs 120', with the discs 120' being cooperable with a plurality of interleaved friction elements or discs 122' that are mounted for longitudinal sliding movement upon one or more longitudinally extending retaining lugs 126' that are integrally mounted on the longitudinally inner side of the end wall member 206.

Means for actuating the motor brake unit 200 is provided by an annular piston member, generally designated 74', which extends around the outer periphery of the collar 22' and is disposed between the plurality of discs 120', 122' and the end wall member 204, as illustrated. The piston member 74' defines a radially extending abutment face 80' which is adapted to cooperate with an abutment face 29' defined on the inner side of the end wall member 206 in compressingly engaging the discs 120', 122' during a braking operation. Means in the form of a plurality of suitable circumferentially spaced coil springs 88' are nestingly received within suitable annular recesses 84' formed in one end of the piston member 74' and are adapted to exert an axially outwardly directed force against the member 74'. Suitable sealing means, such as O-ring sealing means or the like 226 and 228, are preferably provided between the inner periphery of the enclosure member 202 and the outer periphery of the piston member 74', with the axially outer side of the piston member 74' being communicable via fluid passage means 230 with a suitable source of pressurized actuating fluid.

As in the motor brake unit 10, the interior of the cavity 26' is filled with a cooling medium such as oil which functions to transmit or conduct the heat produced during successive braking operations toward the exterior of the unit 200, whereby to provide for efficient operation thereof, which operation is similar to that of the aforedescribed unit 10 in that the plurality of coil springs 88' function to normally bias the piston member 74' toward the right in FIG. 2, thereby compressingly engaging the plurality of discs 120' and 122' between the opposed faces 80' and 29', with the result that rotation of the shaft 18' is effectively prevented. At such time as it is desired to relieve the braked condition, the aforementioned source of pressurized fluid is communicated via the passage 230 to the right side of the piston member 74', thereby forcing the piston member 74' toward the left in FIG. 2 against the resistance of the plurality of springs 88'. Such longitudinal movement of the member 74' will effect leftward movement of the face 80', resulting in disengagement thereof from the adjacent disc 122', thereby releasing the shaft 18' to permit operation of the associated motor.

FIG. 3 illustrates another embodiment of the present invention and in particular, shows how the motor brake unit 10 may be adapted for operative association with motors having external housings or enclosures which are somewhat larger in diameter or cross-sectional size then the motor 20 illustrated in FIG. 1. More specifically, FIG. 3 illustrates how the shoulder 32 of the enclosure member 14 may be secured by the screws, bolts or the like 42 to an annular adaptor ring 300 which extends radially outwardly from the member 14 and is in turn adapted to be secured to the associated motor housing 302 by means of suitable screws, bolts or the like 304. It will thus be seen that the motor brake units 10 and 200 will find universality of application with various size and types of motors so that said units 10, 200 will find wide and varied use.

A particular feature of the present invention resides in the fact that the motor brake units 10 and 200 may be completely preassembled before being transmitted to the consumer for operative installation. This is an important advantage over similar type devices heretofore known and used, since such prior devices must be assembled or "built up" directly on the motor shaft in situ. The present invention, on the other hand, permits the entire unit to be assembled (with the exception of the mounting flange), so as to minimize assembly time and positively obviate the possibility of misassembly thereof by an operator unfamiliar with the construction of the unit. Another feature of the present invention resides in the fact that the motor brake unit is completely sealed to the atmosphere, thereby positively preventing any ingress of dirt, dust or other foreign material. This assures a long and efficient operational life as compared with prior devices, such as dry friction brakes, which of necessity are provided with air passages for air circulation and the like.

While it will be apparent that the preferred embodiments illustrated herein are well calculated to fulfill the objects above stated, it will be appreciated that the present invention is susceptible to modification, variation and change.

I claim:

1. In combination with a motor having a motor enclosure provided with a generally radially disposed mounting end portion and a rotatable drive shaft projecting axially outwardly therefrom, a preassembled brake unit adapted to be surmounted axially onto the drive shaft and be fixedly attached to the mounting end portion of the motor enclosure, the unit comprising: a sleeve member having a bore located at one end adapted to nestingly receive the drive shaft for rotation therewith; a housing structure defining an internal cavity at least partially surrounding said sleeve member, said structure having a first end portion adapted to be moved into confronting relationship with said mounting end portion, said housing structure further having a second end portion axially spaced from said first end portion; separate bearing and seal means interposed between said second end portion and the end of said sleeve opposite said first mentioned end portion thereof for respectively rotatably supporting and sealing said opposite end of said sleeve relative to said housing structure; fastening means extending between said first end portion and said mounting end portion for non-rotatably connecting said structure to the motor; a liquid heat transfer medium at least partially filling said internal cavity; a first plurality of brake elements located in said internal cavity and rotatable with said sleeve member; a second plurality of brake elements located in said internal cavity and non-rotatably supported by said housing structure; piston means movable axially of said drive shaft and slidably supported by said housing structure proximate said first end thereof for selectively engaging and disengaging said first and second plurality of brake elements; and spring means located between said first end portion and said piston means for normally biasing said piston means in an axial direction to engage said first and second brake elements.

2. In combination with a motor having a motor enclosure provided with a generally radially disposed mounting end portion and a rotatable drive shaft projecting axially outwardly therefrom, a preassembled brake unit adapted to be surmounted axially onto the drive shaft and be fixedly attached to the mounting end portion of the motor enclosure, the unit comprising: an adapter plate connected to said mounting end portion, a sleeve member having a bore located at one end adapted to nestingly receive the drive shaft for rotation therewith; a housing structure defining an internal cavity at least partially surrounding said sleeve member, said structure having a first end portion adapted to be moved into confronting relationship with said adapter plate, said housing structure further having a second end portion axially spaced from said first end portion; separate bearing and seal means interposed between said second end portion and the end of said sleeve opposite said first mentioned end portion thereof for respectively rotatably supporting and sealing said opposite end of said sleeve relative to said housing structure; fastening means extending between said first end portion and said mounting end portion for non-rotatably connecting said structure to the motor; a liquid heat transfer medium at least partially filling said internal cavity; a first plurality of brake elements located in said internal cavity and rotatable with said sleeve member; a second plurality of brake elements located in said internal cavity and non-rotatably supported by said housing structure; piston means movable axially of said drive shaft and slidably supported by said housing structure proximate said second end thereof for selectively engaging and disengaging said first and second plurality of brake elements; and spring means located between said second end portion of said housing structure and said piston means for normally biasing said piston means in an axial direction to engage said first and second brake elements.

3. In combination with a motor having a motor enclosure provided with a generally radially disposed mounting end portion and a rotatable drive shaft projecting axially outwardly therefrom, a preassembled brake unit adapted to be surmounted axially onto the drive shaft and be fixedly attached to the mounting end portion of the motor enclosure, the unit comprising: a sleeve member having a bore located at one end adapted to nestingly receive the drive shaft for rotation therewith; a housing structure defining an internal cavity at least partially surrounding said sleeve member, said structure having a first end portion adapted to be moved into confronting relationship with said mounting end portion of said motor enclosure, said housing structure further having a second end portion axially spaced from said first end portion; separate bearing and seal means interposed between said second end portion and the end of said sleeve opposite said first mentioned end portion thereof for respectively rotatably supporting and sealing said opposite end of said sleeve relative to said housing structure; fastening means extending between said first end portion and said mounting end portion for non-rotatably connecting said structure to the motor; a liquid heat transfer medium at least partially filling said internal cavity; a first plurality of brake elements located in said internal cavity and rotatable with said sleeve member; a second plurality of brake elements located in said internal cavity and non-rotatably supported by said housing structure; and actuating means for selectively engaging and disengaging said first and second plurality of brake elements, said actuating means including fluid actuable piston means movable axially of said drive shaft, and spring means for normally biasing said piston means in an axial direction to engage said first and second plurality of brake elements.

4. The combination as set forth in claim 1 wherein said piston means is air-pressure actuated.

5. The combination as set forth in claim 1 wherein said brake elements are at least partially submerged in said fluid heat transfer medium.

6. The combination as set forth in claim 3 which includes fluid passage defining means for communicating cooling fluid around said pluralities of brake elements for transferring heat to the exterior of said housing structure.

7. The combination as set forth in claim 3 wherein said brake unit is completely sealed to the atmosphere to prevent the ingress of dirt, dust and the like into said housing structure thereof.

8. The combination as set forth in claim 3 wherein said fluid heat transfer medium is sheared by selectively engaging and disengaging said first and second plurality of brake elements.

* * * * *